United States Patent
Ishiwata

(10) Patent No.: US 7,035,957 B2
(45) Date of Patent: Apr. 25, 2006

(54) BUS BRIDGE CIRCUIT, BUS CONNECTION SYSTEM, AND BUFFER CONTROL METHOD FOR BUS BRIDGE CIRCUIT

(75) Inventor: Yasuo Ishiwata, Kahoku (JP)

(73) Assignee: Fujitsu Limited, Kawasaki (JP)

( * ) Notice: Subject to any disclaimer, the term of this patent is extended or adjusted under 35 U.S.C. 154(b) by 166 days.

(21) Appl. No.: 10/742,974

(22) Filed: Dec. 23, 2003

(65) Prior Publication Data
US 2004/0139268 A1 Jul. 15, 2004

(30) Foreign Application Priority Data
Jan. 10, 2003 (JP) ............................ 2003-004995

(51) Int. Cl.
*G06F 13/36* (2006.01)
*G06F 13/38* (2006.01)

(52) U.S. Cl. .................. 710/306; 710/310; 370/401; 370/402

(58) Field of Classification Search ................ 710/310, 710/306, 105, 107, 118, 33, 60, 52, 305; 709/217, 253; 370/401–402; 345/541, 537; 711/147
See application file for complete search history.

(56) References Cited

U.S. PATENT DOCUMENTS

| 4,972,495 | A | * | 11/1990 | Blike et al. ................. 382/304 |
| 5,396,597 | A | * | 3/1995 | Bodin et al. ................. 345/541 |
| 5,857,082 | A | * | 1/1999 | Murdoch et al. ........... 710/310 |
| 5,905,911 | A | * | 5/1999 | Shimizu ....................... 710/22 |
| 6,078,976 | A | | 6/2000 | Obayashi |
| 6,292,873 | B1 | * | 9/2001 | Keaveny et al. ............ 711/149 |

FOREIGN PATENT DOCUMENTS

JP 11-338815 12/1999

OTHER PUBLICATIONS

"The TIME-WAIT state in TCP and its effect on busy servers" by Faber et al. (abstract only) Publication Date: Mar. 21-25, 1999.*

* cited by examiner

*Primary Examiner*—Gopal C. Ray
(74) *Attorney, Agent, or Firm*—Staas & Halsley LLP

(57) ABSTRACT

A PCI bridge circuit connects to first and second PCI buses and performs data transfer between PCI devices. The PCI bridge circuit has a data buffer and controller and the controller 70, prior to the establishment of a data transfer state with the first PCI device via the first PCI bus, receives data from the second PCI device via the second PCI bus into a data buffer and inserts a wait state. Consequently while reducing the capacity of the data buffer, data transfer between PCI devices can be performed without affecting the transfer performance.

21 Claims, 7 Drawing Sheets

BUS BRIDGE CIRCUIT, BUS CONNECTION SYSTEM, AND BUFFER CONTROL METHOD FOR BUS BRIDGE CIRCUIT

CROSS-REFERENCE TO RELATED APPLICATIONS

This application is based upon and claims the benefit of priority from the prior Japanese Patent Application No. 2003-004995, filed on Jan. 10, 2003, the entire contents of which are incorporated herein by reference.

BACKGROUND OF THE INVENTION

1. Field of the Invention

This invention relates to a bus bridge circuit, bus connection system, and buffer control method for a bus bridge circuit to connect two PCI buses or similar and performs data transfer between two buses, and in particular, relates to a bus bridge circuit, bus connection system, and buffer control method for a bus bridge circuit to control a buffer which stores data for transfer between two buses.

2. Description of the Related Art

Various functional devices are connected by buses in computer systems to realize various functions. With the spread of personal computers in recent years, controller or similar are constructed by connecting functional devices developed for personal computers by a Peripheral Component Interconnect (PCI) bus.

On the other hand, when devices with different functions are connected by a bus, it is effective to provide bridge circuits in the bus between devices. FIG. 6 is a drawing of the conventional configuration of a bridge circuit (PCI bridge circuit) connected to PCI buses; FIG. 7 is a drawing of the timing chart of transfer operation of the bridge circuit.

The PCI bridge circuit 104 is connected to two PCI buses 200, 300, and performs data transfer between a PCI device 100 connected to the PCI bus 200, and a PCI device 102 connected to the PCI bus 300. The PCI bridge circuit 104 comprises a FIFO (fast-in fast-out) buffer 114 which stores transfer data; a target control circuit 110 which performs control as the target, as seen by the PCI device; and a master control circuit 112 which performs control as the master, as seen by the PCI device.

In the case (called writing) in which data is transferred from the PCI device 100 to the PCI device 102, a write request is issued to the PCI bridge circuit 104 from the PCI device 100, and then a write request is issued to the PCI device 102 from the PCI bridge circuit 104. The PCI bridge circuit 104 temporarily writes the data received from the PCI device 100 via the primary-side PCI bus 200 to the FIFO buffer 114, and then transfers the data to the PCI device 102 via the secondary-side PCI bus 300.

This is explained in detail using FIG. 7. First, the PCI device 100 issues a write request to the PCI bridge circuit 104, and then *IRDY (Initiator Ready) 2 is set to low (the ready state). By this means, the PCI bridge circuit 104 enters the state to receive data; then *TRDY (Target Ready) 2 input to the PCI device 100 is set low (the ready state).

The PCI device 100 confirms that both the ready signals *IRDY2 and *TRDY2 are low, and then outputs the transfer data to the primary-side PCI bus 200. At the PCI bridge circuit 104, this transfer data is written in sequence to the FIFO buffer 114.

On the other hand, the PCI bridge circuit 104 performs internal processing according to the PCI bus protocol, acquires bus ownership, and establishes a data transfer state with the PCI device 102, then the PCI bridge circuit 104 issues a write request to the PCI device 102, and sets *IRDY (Initiator Ready) 1 to low (the ready state). By this means, when the PCI device 102 enters the state to receive data, *TRDY (Target Ready) 1 for the PCI bridge circuit 104 is set to low (the ready state).

The PCI bridge circuit 104 confirms that both the ready signals *IRDY1 and *TRDY1 are low, and then outputs the transfer data in the FIFO buffer 114 to the secondary-side PCI bus 300. At the PCI device 102, this transfer data is received in sequence.

In this way, data transfer is performed between the PCI devices 100 and 102 via the PCI bridge circuit 104.

In the above explanation of the prior art, when the data transfer rates of the primary-side bus 200 and the secondary-side bus 300 are the same, after establishing data transfer states for the buses 200, 300 on both sides, the amounts of data entering and leaving the FIFO buffer 114 are the same, so that the amount of data in the FIFO buffer 114 is maintained at a constant state.

However, as shown in FIG. 7, after data transfer from the primary-side bus 200 is initiated, there is a waiting period for finalization of the data transfer state before initiation of data transfer on the secondary-side bus 300, and the FIFO buffer 114 must be of sufficient size to accumulate the data received by the PCI bridge circuit 104 during this period.

This time waiting period for finalization of the data transfer state is, in the example of FIG. 6 and FIG. 7, determined by two lengths of time: the internal processing time for the target control circuit 110 to receive the write request from the PCI device 100 and to transmit this to the master control circuit 112, and for the master control circuit 112 to perform command generation processing for the PCI device 102 conforming to the PCI bus protocol, and the ownership capture processing-time for performing capture control of ownership of the secondary-side PCI bus 300, actually capturing ownership, and connecting to the PCI device 102. Further, when a plurality of PCI devices are connected to the PCI bus 300, this ownership capture processing time is affected by the amount of traffic on the PCI bus 300.

Consequently the size (capacity) of the FIFO buffer 114 of the PCI bridge circuit 104 must be made large, leading to an increase in the size of the chip of the PCI bridge circuit 104, and resulting in the problem that reduction of the chip size is difficult; and there is the further problem that the cost of the PCI bridge circuit 104 is increased.

SUMMARY OF THE INVENTION

An object of this invention is to provide a bus bridge circuit, bus connection system and buffer control method for a bus bridge circuit, to reduce the size of the data buffer of the bus bridge circuit.

A further object of this invention is to provide a bus bridge circuit, bus connection system and buffer control method for a bus bridge circuit, to reduce the size of the data buffer of the bus bridge circuit without modifying the bus protocol.

Still a further object of this invention is to provide a bus bridge circuit, bus connection system and buffer control method for a bus bridge circuit, to reduce the size of the data buffer of the bus bridge circuit without modifying the data transfer time between devices.

In order to achieve these objects, a bus bridge circuit and bus connection system of this invention have a bus bridge circuit which transfers data from a second device via a second bus to a first device via a first bus; this bus bridge circuit has a data buffer which stores data of the above second bus, and a controller which, prior to establishment of a data transfer state with the above first device via the above first bus, receives data from the above second device via the above second bus in the above data buffer, with a wait state inserted, and after establishment of a data transfer state with the above first device via the above first bus, receives data from the above second device via the above second bus in the above data buffer, without a wait state inserted.

The buffer control method for a bus bridge circuit is a buffer control method for a bus bridge circuit which, after storing in a data buffer the data from a second device via a second bus, transfers the data to a first device via a first bus; the buffer control method has a first step for receiving data in the above data buffer, with a wait state inserted, from the above second device via the above second bus prior to the establishment of a data transfer state with the above first device via the above first bus, and a second step for receiving data in the above data buffer, without a wait state inserted, from the above second device via the second bus after establishment of a data transfer state with the above first device via the above first bus.

In this invention, prior to the establishment of a data transfer state with the first device via the first bus, a wait state is inserted upon reception in the data buffer of data from the second device via the second bus, so that data transfer between devices is possible without affecting transfer performance even when the data buffer capacity is made small.

In this invention, it is preferable that the above controller, prior to establishment of the above data transfer state, return a target ready signal with a wait state inserted to the above second device in response to the initiator ready signal from the above second device, and, after the establishment of the above data transfer state, transmit a target ready signal without a wait state inserted to the above second device. The wait control is performed by controlling the ready signal, so that this operation can easily be realized without modifying the bus protocol.

Further, in this invention it is preferable-that the above controller, after the establishment of the data transfer state with the above first device via the above first bus, transfer the data of the above data buffer to the above first device via the above first bus. Consequently after the establishment of the data transfer state, the input and output of data to and from the data buffer can be made the same.

In this invention, it is preferable that the above controller, through the establishment of the data transfer state with the above first device via the above first bus, transmit an initiator ready signal to the above first device, receive a target ready signal from the above first device, and transfer the data of the above data buffer to the above first device via the above first bus. Consequently the establishment of the data transfer state can be judged utilizing the bus protocol.

In this invention, it is preferable that the above data buffer comprise a FIFO buffer, by which means data transfer can easily be controlled.

In this invention, it is preferable that the above controller have a generation circuit to control the insertion of a wait state into target ready signals for the above second device in response to initiator ready signals from the above-second-device, according to initiator ready signals and target ready signals of the above first device. Consequently, implementation through the addition of a simple circuit is possible.

In this invention, it is preferable that the above controller have a ready signal generation circuit to control the insertion of a wait state into target ready signals for the above second device in response to initiator ready signals from the above second device, corresponding to before the above data transfer state and after the above data transfer state. Consequently, implementation through the addition of a simple circuit is possible.

In this invention, it is preferable that the above ready signal generation circuit comprise a generation circuit to control the insertion of a wait state into target ready signals for the above second device in response to initiator ready signals from the above second device, according to initiator ready signals and target ready signals of the above first device. Consequently, implementation through the addition of a simple circuit is possible.

DESCRIPTION OF THE PREFERRED EMBODIMENTS

Below, embodiments of this, invention are explained, in the order PCI bus connection systems, PCI bridge circuits, and other embodiments.

(PCI Bus Connection Systems)

Figure 1:
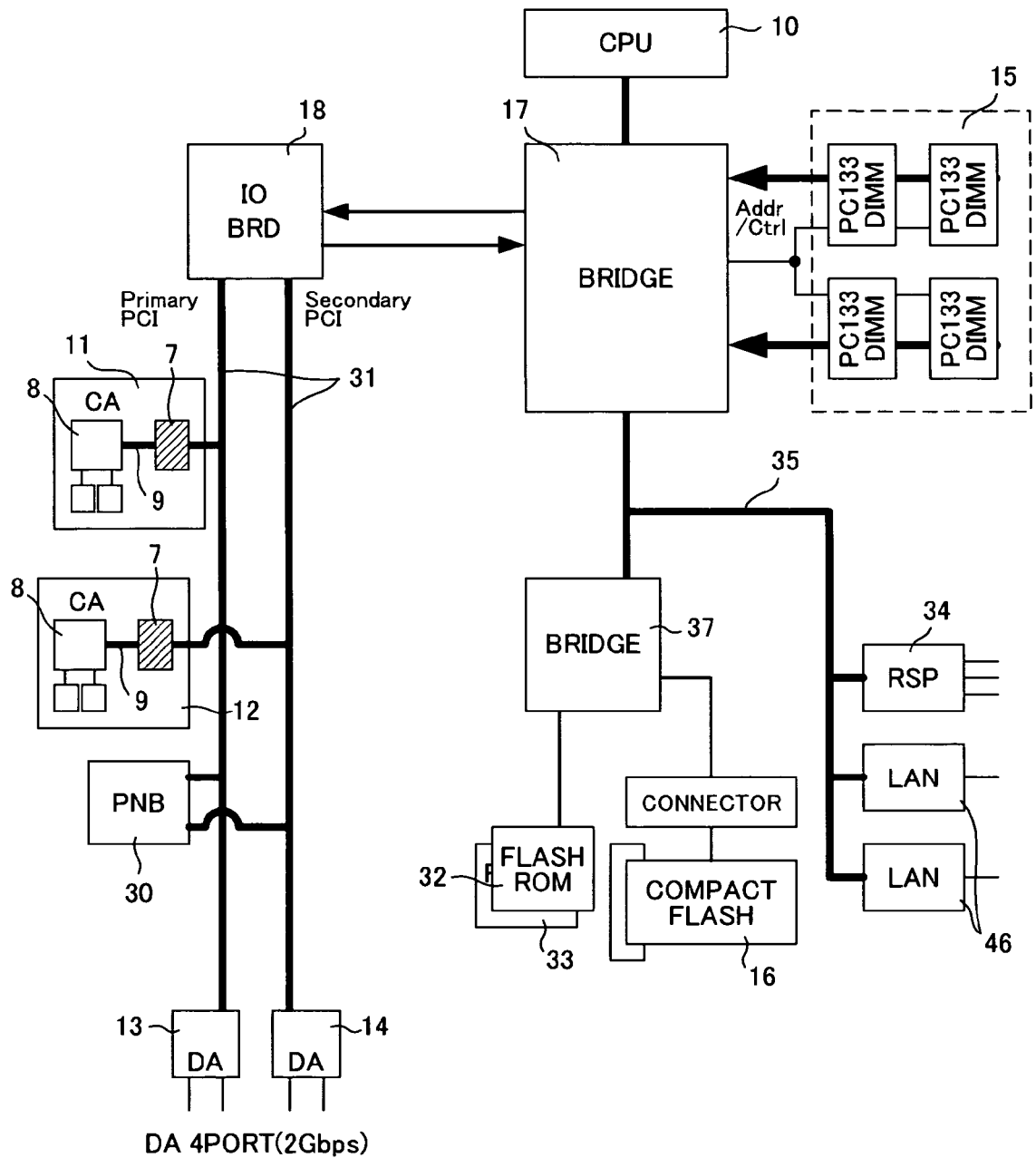
FIG. 1 is a block diagram of the PCI bus connection system according to an embodiment of this invention.
Figure 2:
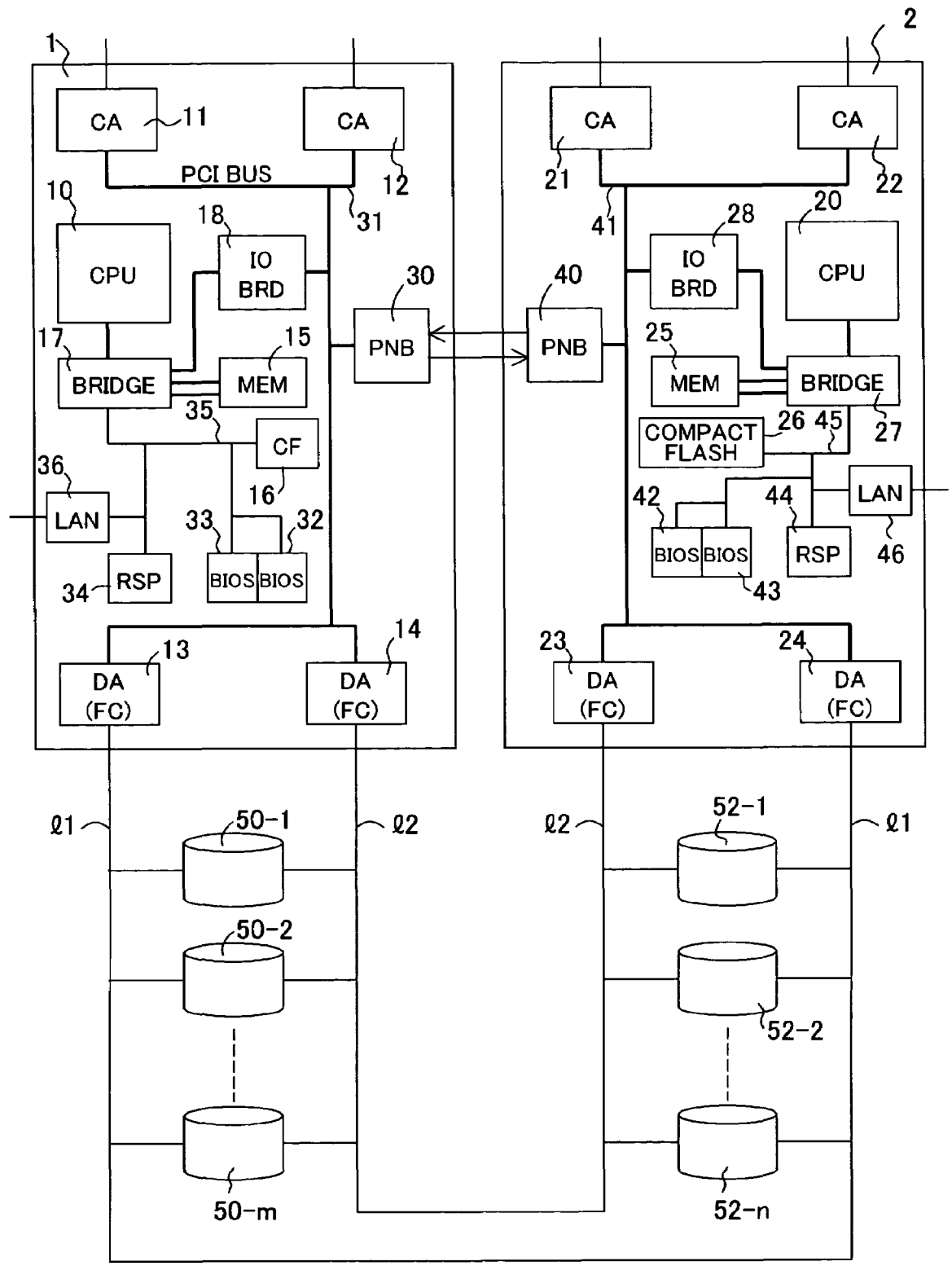
FIG. 2 is a drawing of the configuration of a storage system to which the configuration of FIG. 1 is applied.

FIG. 1 is a drawing of the configuration of a PCI bus connection system according to an embodiment of this invention; FIG. 2 is a drawing of the configuration of a storage system in which the PCI connection system of FIG. 1 is used as a controller. FIG. 2 shows a RAID (Redundant Arrays of Inexpensive Disks) system using magnetic disks.

As shown in FIG. 2, the storage system comprises a pair of magnetic disk controllers (hereafter called "controllers") 1, 2, and plural magnetic disk devices 50-1 to 50-m and 52-1 to 52-n, connected by lines 11, 12 to this pair of controllers 1, 2.

The controllers 1, 2 are connected, either directly or via network equipment, to a host and server, in a system enabling rapid random-access writing and reading of large amounts of data of the host and server to and from RAID disk drives (magnetic disk devices). The pair of controllers 1, 2 have the same configuration, comprising function modules for CAs (Channel Adapters) 11, 12, 21, 22, CMs (Centralized Modules) 10, 15 to 19, 20, and 25 to 29, and DAs (Device Adapters) 13, 14, 23, 24.

The CAs (Channel Adapters) 11, 12, 21, 22 are circuits governing control of the host interface connected to the host, and as described below, comprise fiber channel circuit and similar. DAs (Device Adapters) 13, 14, 23, 24 are circuits which exchange commands and data with disk devices in order to control the disk devices 50-1 to 50-m and 52-1 to 52-n, and comprise, for example fiber channel circuits (FCs) and DMA circuits or similar. CMs (Centralized Modules) have CPUs 10, 20; bridge circuits 17, 27; memory (RAM)

15, 25; compact flash memory 16, 26; IO bridge circuits 18, 28; and pairs of BIOS flash memory 32, 33, 42, 43.

Further, CMs have RSPs (Remote Service Processors) 34, 44 and LAN ports for external connection 36, 46. The memory 15, 25 is backed up by batteries, and is used as main memory.

The CPUs 10, 20 are connected via the bridge circuits 17, 27 to the memory 15, 25, the compact flash memory 16, 26, and the IO bridge circuits 18, 28. The memory 15, 25 is used as work areas and cache areas for the CPUs 10, 20; the compact flash memory 19, 29 store programs for execution by the CPUs 10, 20. As such programs, a kernel, file access program (read/write program), RAID management program, and similar are stored.

BIOS flash memory 32, 33, 42, 43 is provided in a paired configuration for redundancy, one used for operation and the other for standby, storing the BIOS. The CPUs 10, 20 execute these programs, and execute read/write processing, RAID management processing and similar.

The PCI buses 35, 45 are connected via the bridge circuits 17, 27 to the CPUs 10, 20, the compact flash memory 15, 25, the pairs of BIOS flash memory 32, 33, 42, 43, the RSPs 34, 44, and the LAN ports 36, 46.

The RSPs 34, 44 comprise processors which perform various state management and remote services. The LAN ports 36, 46 are used for connection to external LANs (Local Area Networks).

The PCI (Peripheral Component Interconnect) buses 31, 41 connect the CAs 11, 12, 21, 22 and DAs 13, 14, 23, 24, and also connect the CPUs 10, 20 and memory 15, 25 via the IO bridge circuits 18, 28. The PCI buses 31, 41 are also connected to the PCI node link bridge (PNB) circuits 30, 40.

The PCI node link bridge circuit 30 of the controller 1 is connected to the PCI node link bridge circuit 40 of the controller 2, to exchange commands and data between the controllers 1, 2.

The controller 1 controls, for example, the disk devices 50-1 to 50-m, and the controller 2 controls, for example, the disk devices 52-1 to 52-n. In FIG. 2, the disk devices 50-1 to 50-m and 52-1- to 52-n have a RAID 5 configuration.

FIG. 1 shows in detail the configuration of the controller 1 only; components which are the same as in FIG. 2 are assigned the same symbols. Controller 2 has the same configuration. In FIG. 1, the CAs 11, 12 each comprise a PCI bridge circuit 7, PCI bus 9, and an FCC (fiber channel controller) 8 which is a PCI device.

That is, the CAs 11, 12 comprise a PCI bridge circuit 7, which is connected to the IO bridge circuit (PCI device) 18 via the first PCI bus 31; an FCC (PCI device) 8; and a second PCI bus 9 connected to the PCI bridge circuit 7 and FCC 8. The first PCI bus 31 is connected to the above-described PNB 30 and DAs 13, 14.

That is, the input/output system bus connects, through the IO bridge circuit 18, the data processing system (CPU 10, memory 15, 32, 33, 16 and similar) and the input/output system. As described below using FIG. 3, since a CRC (Cyclic Redundancy Code) is appended to the data of the storage system, and a CRC is not appended to data from the host, the PCI bridge circuit 7 appends a CRC to data from the host, and deletes the CRC from data for transmission to the host. The bridge circuit 37 is a bridge connecting the flash memory 32, 33 and compact flash memory 16, which are memory units with different properties, to the PCI bus 35.

(PCI Bridge Circuit)

Figure 3:
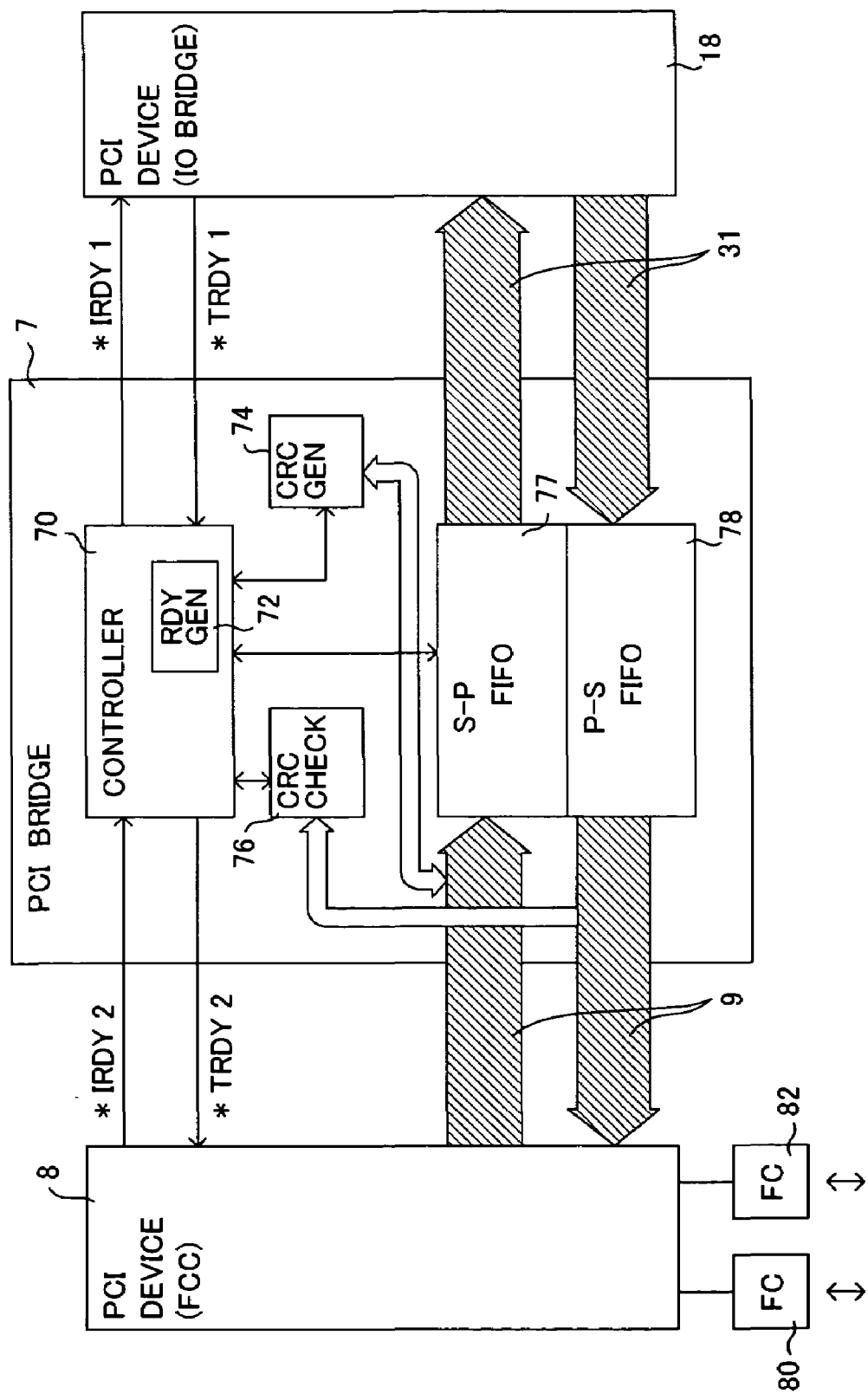
FIG. 3 is a drawing of the configuration of the PCI bridge circuit of FIG. 1.
Figure 4:
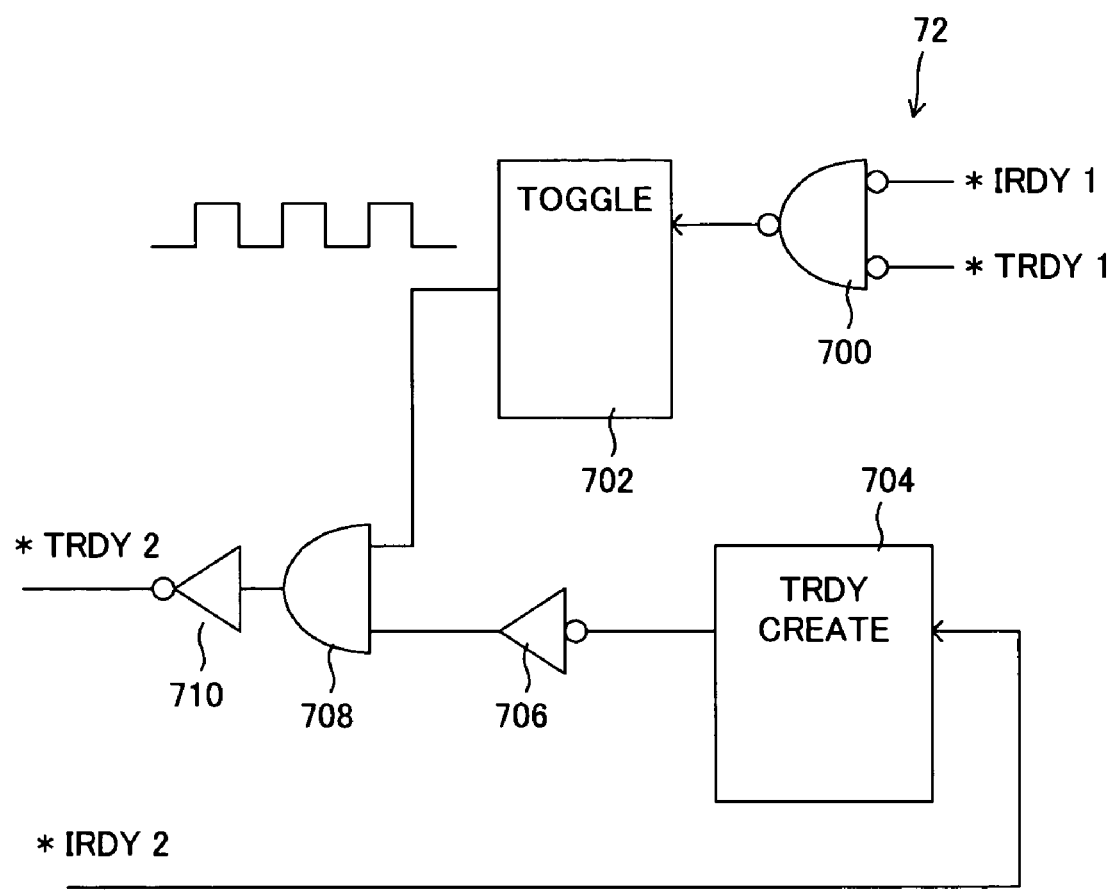
FIG. 4 is a circuit diagram of the ready signal generation circuit of FIG. 3.
Figure 5:
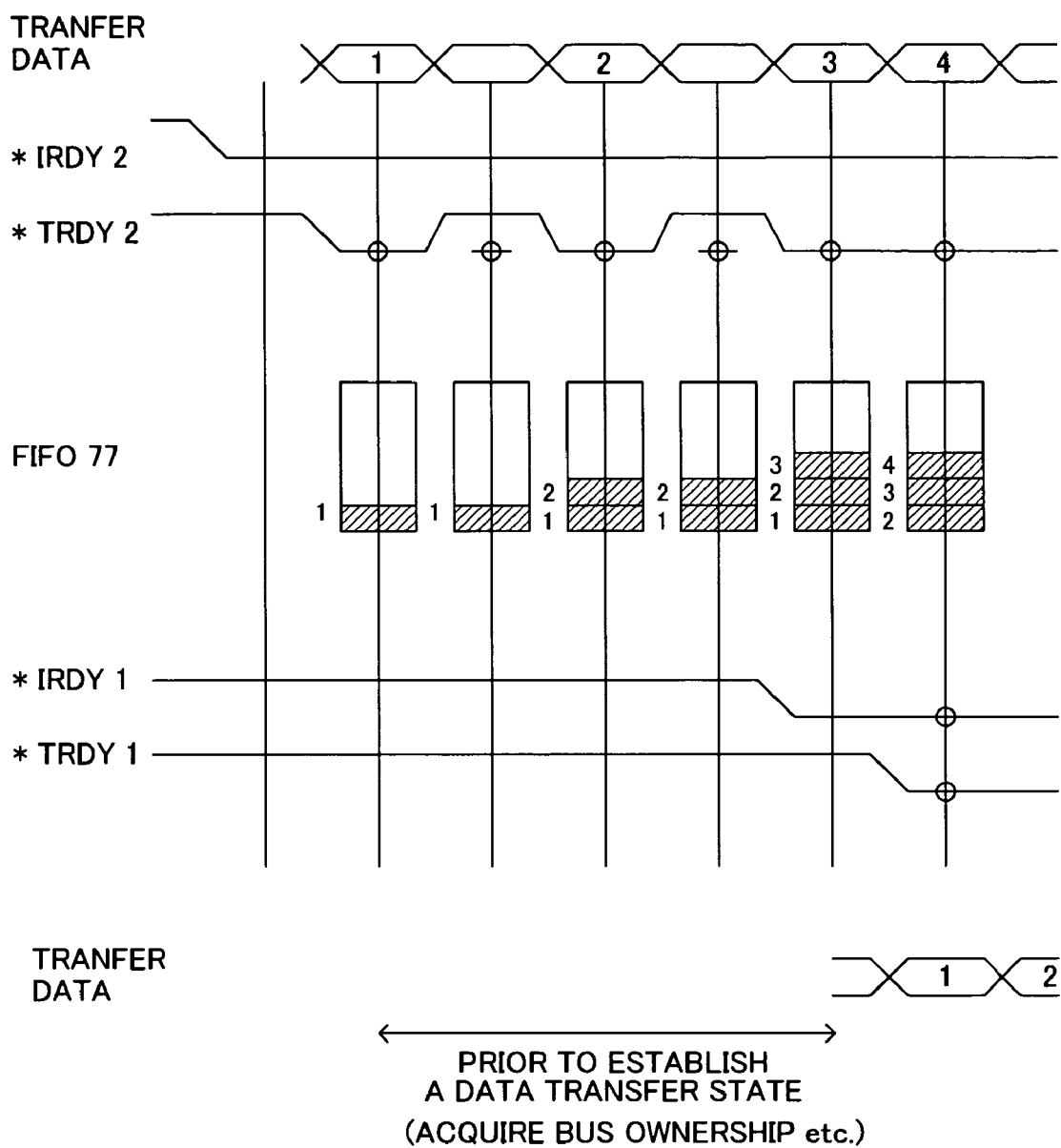
FIG. 5 is a timing chart of data transfer operation of the PCI bridge circuit of FIG. 3.
Figure 6:
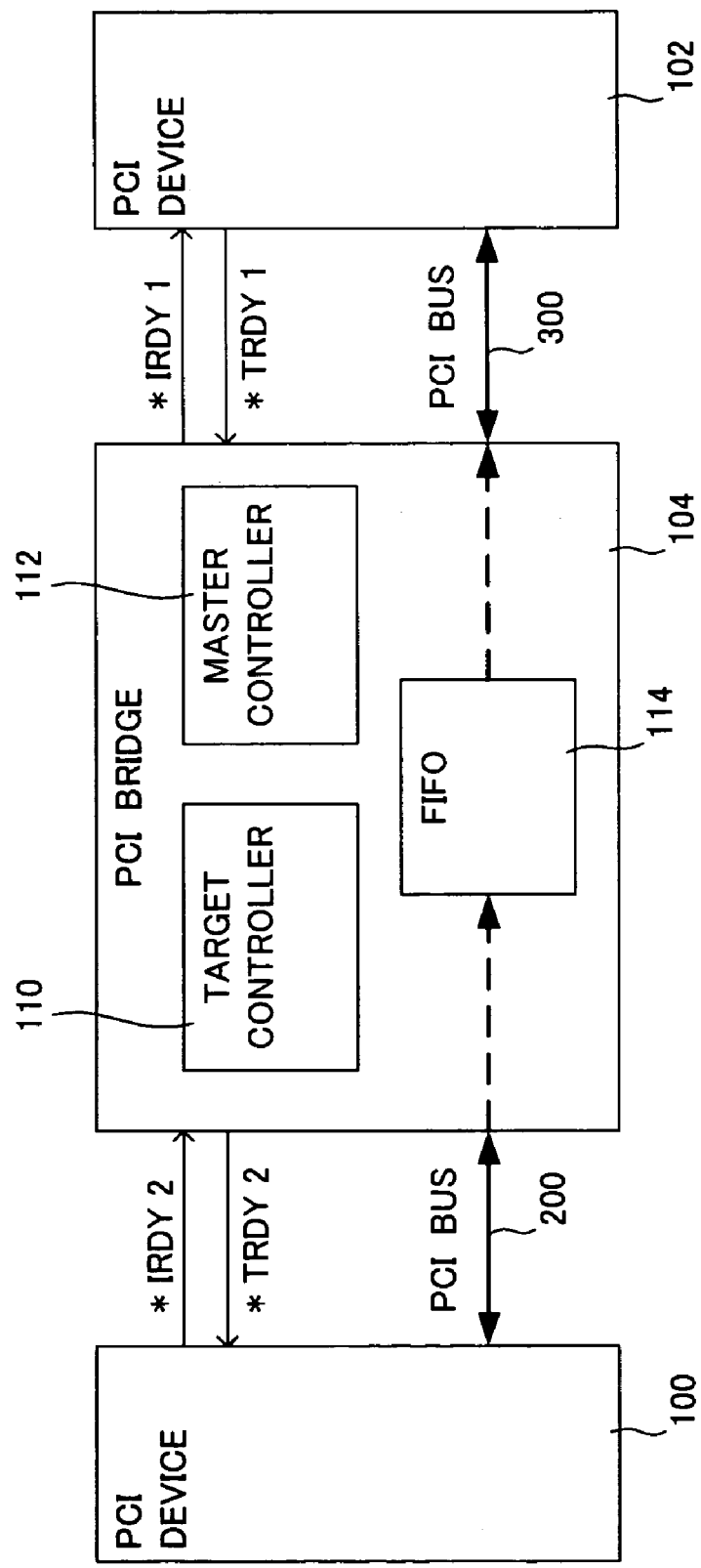
FIG. 6 is a drawing of the configuration of a conventional PCI bridge circuit; and, FIG. 7 is a drawing explaining the data transfer operation of a conventional PCI bridge circuit.
Figure 7:
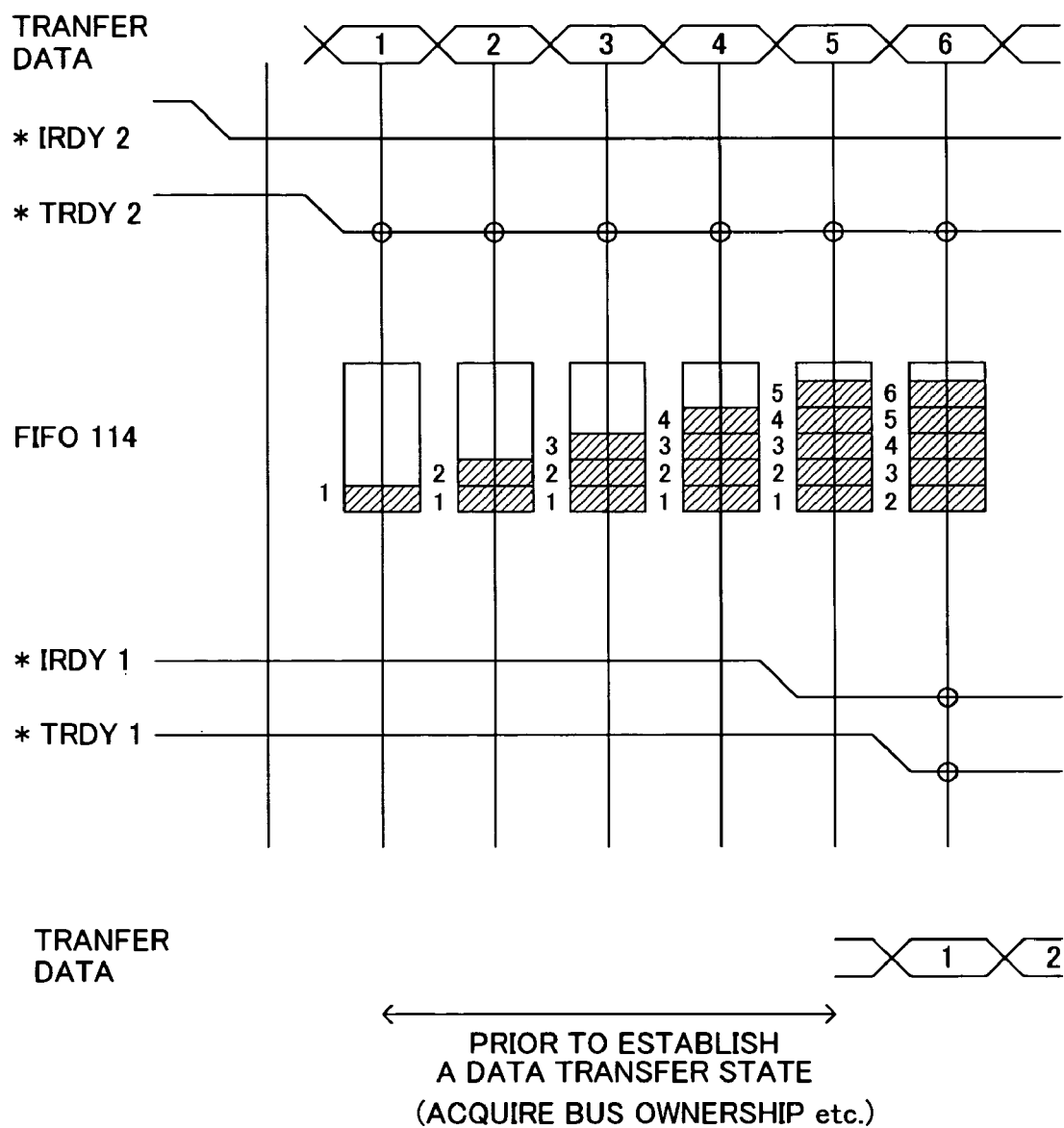

Next, the PCI bridge circuit is explained. FIG. 3 is a block diagram of a PCI bridge circuit; FIG. 4 is a circuit diagram of the ready signal generation circuit of FIG. 3; and FIG. 5 is a timing chart of data transfer operation via the PCI bridge circuit.

As shown in FIG. 3, the IO bridge circuit (PCI device) 18 is connected to the PCI bridge circuit 7 by the first PCI bus 31, and the PCI bridge circuit 7 is connected to the FCC (PCI device) 8 by the second PCI bus 9. A pair of FC transceivers 80, 82 is provided in the FCC 8. The FC transceivers 80, 82 are connected in an FC (fiber channel) loop, connecting the host and network.

The PCI bridge circuit 7 has an S-P (Secondary-Primary) FIFO (fast-in fast-out) buffer 77 which stores host data (transfer data) of the second PCI bus 9 from the PCI device 8, and a P-S (Primary-Secondary) FIFO buffer 78 which stores the stored data (transfer data) of the first PCI bus 31 from the PCI device 18 and transfers the data to the PCI device 8.

The PCI bridge circuit 7 also has a CRC generation circuit 74, which receives host data of the second PCI bus 9, creates and appends a CRC to the host data, a CRC check circuit 76 which performs a CRC check of stored data for output to the second PCI bus 9 from the P-S FIFO 78 and deletes the CRCs, and a controller 70 which controls the FIFOs 77, 78, the CRC generation circuit 74, and the CRC check circuit 76 according to ready signals.

The controller 70 has a ready signal generation circuit 72, explained in FIG. 4. Only those ready signals transmitted to and from the controller 70 which are employed when transferring data from the PCI device 8 to the PCI device 18 via the S-P FIFO 77 (writing) are shown. That is, the controller 70 receives an *IRDY (Initiator Ready) 2 from the PCI device 8, and returns a *TRDY (Target Ready) 2 to the PCI device 8.

Similarly, the controller 70 transmits an *IRDY (Initiator Ready) 1 to the PCI device 18, and receives a *TRDY (Target Ready) 1 from the PCI device 18.

The ready signal generation circuit 72 of the controller 70 employs *IRDY 1 and *TRDY 1 on the side of the first PCI bus 31 to control *TRDY 2 generated for *IRDY 2 on the side of the second PCI bus 9.

That is, as shown in FIG. 4, the ready signal generation circuit 72 has an AND gate 700 which ANDs *IRDY 1 and *TRDY 1 on the side of the first PCI bus 31, a toggle circuit 702 which uses the output of the AND gate 700 to generate an intermittent gate signal at each clock pulse, a TRDY generation circuit 704 which generates *TRDY 2 on the second PCI bus 9 to generate a *TRDY 2, an AND gate 708 which ANDs the output of the inverter circuit 706 and the output of the toggle circuit 702, and an inverter circuit 710 which inverts the output of the AND gate 708 and generates a *TRDY 2 for output.

FIG. 5 is used to explain the operation of the configuration in FIG. 3 and FIG. 4. The PCI device 8, after issuing a write request to the PCI bridge circuit 7, sets *IRDY (Initiator-Ready) 2 to low (the ready state). As a result, when the PCI bridge circuit 7 enters the data-receiving state, the *TRDY (Target Ready) 2 for the PCI device 8 is set to low (the ready state).

On the other hand, the PCI bridge circuit 7 performs internal processing according to the PCI bus protocol, captures bus ownership, and establishes a data transfer state with the PCI device 18. Prior to establishing the data transfer state, *IRDY 1 and *TRDY 1 of the PCI device 18 are high (the not-ready state), and so a high/low repeating intermittent gate signal is generated at each clock pulse from the toggle circuit 702.

Consequently the *TRDY 2 generated by the AND gate 708 and inverter circuit 710 repeats low/high cycles at each clock pulse. When both ready signals *IRDY 2 and *TRDY 2 are low, the PCI device 8 outputs the transfer data to the second PCI bus 9. In the PCI bridge circuit 7, this transfer data is written in sequence to the FIFO buffer 77.

Hence prior to establishing the data transfer state of the first PCI bus 31, the data of the second PCI bus 9 is received, while inserting a wait state at each clock cycle into the second PCI bus 9. That is, data accumulated in the FIFO buffer 77 is half that of the prior art, due to the wait state at each clock cycle.

On the other hand after the PCI bridge circuit 7 performs internal processing according to the PCI bus protocol, captures bus ownership, and establishes a data transfer state with the PCI device 18, the PCI bridge circuit 7 issues a write request to the PCI device 18, and sets *IRDY (Initiator Ready) 1 to low (the ready state). By this means, when the PCI device 18 enters the data reception state, *TRDY (Target Ready) 1 for the PCI bridge circuit 7 goes low (the ready state).

Consequently the occurrence of an intermittent gate signal from the toggle circuit 702 which repeats high and low at each clock cycle is halted, and *TRDY 2 generated by the AND gate 708 and the inverter circuit 710 is continuously low. As explained above, the PCI device 8 outputs transfer data to the second PCI bus 9 when both the ready signals *IRDY 2 and *TRDY 2 are low, and so data is output to the PCI bus 9 in synchronization with the clock, without a wait state. In the PCI bridge circuit 7, the transfer data is written in sequence to the FIFO buffer 77.

The PCI bridge circuit 7 confirms that both ready signals *IRDY 1 and *TRDY 1 are low, and then outputs the transfer data in the FIFO buffer 77 to the secondary-side PCI bus 31, and at the PCI device 18 the transfer data is received in sequence.

Through this control, data transfer between the PCI devices is possible without affecting transfer performance even when the capacity of the buffer 77 is small. Because wait control is performed by controlling *TRDY 2, transfer is realized without-affecting the PCI protocol.

Other Embodiments

In the above-described embodiments, controllers with a redundant configuration of RAID storage system such as that in FIG. 2 were explained; however, application to PCI bus connection systems for other controller or other data processing devices are possible, and as the physical disks of the storage system, magnetic disks, optical discs, magneto-optical discs, and various other storage devices can be employed.

Further, the case of wait control in each clock cycle was explained, but wait control may be performed at every two or more clock cycles. Further, write transfer from a PCI device 8 to a PCI device 18 was explained, but application to data transfer from PCI device 18 to PCI device 8 is also possible, and the PCI device 18 need not be an IO bridge circuit, but may be another PCI device. Here, "PCI bus" includes, in addition to a peripheral component interconnect bus, other computer buses.

In the above, embodiments of this invention have been explained, but the scope of this invention is not limited thereto; various modifications are possible, and are not excluded from the scope of this invention.

Thus in this invention, a wait state are inserted into received data from a second device via the second bus prior to the establishment of a data transfer state with a first device via a first bus, so that data transfer between the devices is possible without affecting transfer performance, even when the capacity of the data buffer is small.

What is claimed is:

1. A bus bridge circuit, which transfers data from a second device via a second bus to a first device via a first bus, comprising:
   a data buffer which stores data of said second bus; and
   a controller which, prior to establishment of a data transfer state with said first device via said first bus, receives data from said second device via said second bus in said data buffer, with a wait state inserted, and returns to said second device a target ready signal, with a wait state inserted, in response to an initiator ready signal from said second device, and after establishment of a data transfer state with said first device via said first bus, transmits to said second device a target ready signal, without a wait state inserted, and receives data from said second device via said second bus in said data buffer, without a wait state inserted.

2. The bus bridge circuit according to claim 1, wherein said data buffer comprises a FIFO buffer.

3. The bus bridge circuit according to claim 1, wherein said controller has a ready signal generation circuit which controls the insertion of a wait state into target ready signals for transmission to said second device in response to initiator ready signals from said second device, according to whether before said data transfer state or after said data transfer state.

4. The bus bridge circuit according to claim 3, wherein said ready signal generation circuit comprises a generation circuit which controls the insertion of a wait state into target ready signals for transmission to said second device in response to initiator ready signals from said second device, according to initiator ready signals and target ready signals for said first device.

5. A bus bridge circuit, which transfers data from a second device via a second bus to a first device via a first bus, comprising:
   a data buffer which stores data of said second bus; and
   a controller which, prior to establishment of a data transfer state with said first device via said first bus, receives data from said second device via said second bus in said data buffer, with a wait state inserted, and after establishment of a data transfer state with said first device via said first bus, receives data from said second device via said second bus in said data buffer, without a wait state inserted, and transfers the data of said data buffer to said first device via said first bus.

6. The bus bridge circuit according to claim 5, wherein said controller, through establishment of a data transfer state with said first device via said first bus, transmits an initiator ready signal to said first device, receives a target ready signal from said first device, and transfers the data of said data buffer to said first device via said first bus.

7. The bus bridge circuit according to claim 6, wherein said controller has a generation circuit which controls the insertion of a wait state into the target ready signals for transmission to said second device in response to initiator ready signals from said second device, according to initiator ready signals and target ready signals for said first device.

8. The bus bridge circuit according to claim 5, wherein said data buffer comprises a FIFO buffer.

9. A bus connection system, comprising:
a second device;
a first device; and,
a bus bridge circuit, connected to said second device by a second bus, and connected to said first device by a first bus, and which transfers data from said second device via said second bus to said first device via said first bus;
wherein said bus bridge circuit comprises:
a data buffer which stores the data of said second device; and
a controller which, prior to the establishment of a data transfer state with said first device via said first bus, receives data from said second device via said second bus in said data buffer, with a wait state inserted, and returns to said second device target ready signals, with a wait state inserted, in response to initiator ready signals from said second device, and after the establishment of a data transfer state with said first device via said first bus, transmits to said second device target ready signals, without a wait state inserted, and receives data from said second device via said second bus in said data buffer, without a wait state inserted.

10. The bus connection system according to claim 9, wherein said data buffer comprises a FIFO buffer.

11. A bus connection system, comprising:
a second device;
a first device; and,
a bus bridge circuit, connected to said second device by a second bus, and connected to said first device by a first bus, and which transfers data from said second device via said second bus to said first device via said first bus;
wherein said bus bridge circuit comprises:
a data buffer which stores the data of said second device; and
a controller which, prior to the establishment of a data transfer state with said first device via said first bus, receives data from said second device via said second bus in said data buffer, with a wait state inserted, and after the establishment of a data transfer state with said first device via said first bus, receives date from said second device via said second bus in said data buffer, without a wait state inserted, and transfers the data of said data buffer to said first device via said first bus.

12. The bus connection system according to claim 11, wherein said controller, by establishing a data transfer state with said first device via said first bus, transmits an initiator ready signal to said first device, receives a target ready signal from said first device, and transfers the data of said data buffer to said first device via said first bus.

13. The bus connection system according to claim 12, wherein said controller has a generation circuit which controls the insertion of a wait state into the target ready signals for transmission to said second device in response to initiator ready signals from said second device, according to initiator ready signals and target ready signals for said first device.

14. The bus connection system according to claim 12, wherein said controller has a ready signal generation circuit which controls the insertion of a wait state into target ready signals for transmission to said second device in response to initiator ready signals from said second device, according to whether before said data transfer state or after said data transfer state.

15. The bus connection system according to claim 14, wherein said ready signal generation circuit comprises a generation circuit which controls the insertion of a wait state into target ready signals for transmission to said second device in response to initiator ready signals from said second device, according to initiator ready signals and target ready signals for said first device.

16. The bus connection system according to claim 11, wherein said data buffer comprises a FIFO buffer.

17. A buffer control method for a bus bridge circuit to store data from a second device via a second bus in a data buffer, and then transfer the data to a first device via a first bus, comprising:
a first step of receiving, prior to the establishment of a data transfer state with said first device via said first bus, the data from said second device via the second bus, inserting a wait state, in said data buffer and returning to said second device a target ready signal with a wait state inserted in response to an initiator ready signal from said second device; and
a second step of transmitting to said second device a target ready signal without said wait state inserted and receiving, after the establishment of a data transfer state with said first device via said first bus, the data from said second device via the second bus, without inserting a wait state, in said data buffer.

18. The buffer control method for a bus bridge circuit according to claim 17, further having a step of controlling the insertion of a wait state in target ready signals for transmission to said second device in response to initiator ready signals from said second device, corresponding to before said data transfer state and after said data transfer state.

19. The buffer control method for a bus bridge circuit according to claim 18, wherein said control step further comprises a step of controlling the insertion of a wait state in target ready signals for transmission to said second device in response to initiator ready signals from said second device, according to initiator ready signals and target ready signals for said first device.

20. A buffer control method for a bus bridge circuit to store data from a second device via a second bus in a data buffer, and then transfer the data to a first device via a first bus, comprising:
a first step of receiving, prior to the establishment of a data transfer state with said first device via said first bus, the data from said second device via the second bus, inserting a wait state, in said data buffer; and
a second step of receiving, after the establishment of a data transfer state with said first device via said first bus, the data from said second device via the second bus, without inserting a wait state, in said data buffer and transferring data from said data buffer to said first device via said first bus.

21. The buffer control method for a bus bridge circuit according to claim 20, wherein said second step has a step of transmitting, through the establishment of a data transfer state with said first device via said first bus, an initiator ready signal to said first device, of receiving a target ready signal from said first device, and of transferring the data of said data buffer to said first device via said first bus.

* * * * *

UNITED STATES PATENT AND TRADEMARK OFFICE
CERTIFICATE OF CORRECTION

PATENT NO. : 7,035,957 B2  Page 1 of 1
APPLICATION NO. : 10/742974
DATED : April 25, 2006
INVENTOR(S) : Yasuo Ishiwata It is certified that error appears in the above-identified patent and that said Letters Patent is hereby corrected as shown below:

Column 9, line 42, change "date" to --data--

Signed and Sealed this

Seventeenth Day of October, 2006

JON W. DUDAS
*Director of the United States Patent and Trademark Office*